(12) United States Patent
Armellin et al.

(10) Patent No.: US 7,094,302 B2
(45) Date of Patent: Aug. 22, 2006

(54) METHOD OF FORMING A BELT STRUCTURE IN A TIRE, IN PARTICULAR FOR MOTORCYCLE WHEELS

(75) Inventors: Giancarlo Armellin, Nova Milanese (IT); Pierangelo Misani, Monza (IT)

(73) Assignee: Pirelli Pneumatici S.p.A., Milan (IT)

( * ) Notice: Subject to any disclaimer, the term of this patent is extended or adjusted under 35 U.S.C. 154(b) by 300 days.

(21) Appl. No.: 10/473,175

(22) PCT Filed: Mar. 8, 2002

(86) PCT No.: PCT/EP02/02553

§ 371 (c)(1),
(2), (4) Date: Apr. 9, 2004

(87) PCT Pub. No.: WO02/078981

PCT Pub. Date: Oct. 10, 2002

(65) Prior Publication Data

US 2004/0159382 A1    Aug. 19, 2004

Related U.S. Application Data

(60) Provisional application No. 60/289,115, filed on May 8, 2001.

(30) Foreign Application Priority Data

Mar. 29, 2001 (EP) .................................. 01830213

(51) Int. Cl.
*B29D 30/16* (2006.01)
*B29D 30/70* (2006.01)
*B60C 9/22* (2006.01)

(52) U.S. Cl. ....................... 156/117; 152/531; 152/532; 156/123

(58) Field of Classification Search ................ 156/117, 156/397, 130, 123; 152/531, 532
See application file for complete search history.

(56) References Cited

U.S. PATENT DOCUMENTS

| 5,221,406 A | 6/1993 | Laurent |
| 5,379,818 A | 1/1995 | Suzuki et al. |
| 6,776,205 B1 * | 8/2004 | Pereira et al. ............... 152/454 |

FOREIGN PATENT DOCUMENTS

| EP | 0 461 646 B1 | 12/1991 |
| EP | 0 718 122 A1 | 6/1996 |
| EP | 0 808 730 A1 | 11/1997 |
| EP | 0 928 680 A1 | 7/1999 |

(Continued)

*Primary Examiner*—Geoffrey L. Knable
(74) *Attorney, Agent, or Firm*—Finnegan, Henderson, Farabow, Garrett & Dunner, L.L.P.

(57) ABSTRACT

A method of forming a belt structure for a tire includes forming at least one laying layer of elastomer material on an outer surface of a support mandrel and helically winding up at least one continuous bare cord on the at least one laying layer to form a plurality of coils. The at least one laying layer is formed by laying down at least one first continuous strip element of elastomer material in a form of helical coils. The helical coils of the at least one first strip element are axially distributed on an outer surface of the support mandrel. The support mandrel is conformed in shape to an outer surface of a carcass structure of the tire. The coils of the at least one cord are disposed axially in side-by-side relationship. The tire may be a tire for a motorcycle.

24 Claims, 2 Drawing Sheets

FOREIGN PATENT DOCUMENTS

| | | |
|---|---|---|
| EP | 0 928 704 A1 | 7/1999 |
| EP | 0 970 797 A2 | 1/2000 |
| EP | 0 976 533 A2 | 2/2000 |
| EP | 0 976 536 A2 | 2/2000 |
| WO | WO 00/20233 | 4/2000 |
| WO | WO 00/38906 | 7/2000 |

* cited by examiner

METHOD OF FORMING A BELT STRUCTURE IN A TIRE, IN PARTICULAR FOR MOTORCYCLE WHEELS

CROSS-REFERENCE TO RELATED APPLICATIONS

This application is a national-phase under 35 U.S.C. § 371 from International Application No. PCT/EP02/02553, filed Mar. 8, 2002, in the European Patent Office, the contents of which are relied upon and incorporated herein by reference; additionally, Applicants claim the right of priority under 35 U.S.C. § 119(a)–(d) based on patent application No. 01830213.3, filed Mar. 29, 2001, in the European Patent Office; further, Applicants claim the benefit under 35 U.S.C. § 119(e) based on provisional application No. 60/289,115, filed May 8, 2001, in the U.S. Patent and Trademark Office.

BACKGROUND OF THE INVENTION

1. Field of the Invention

The present invention relates, in a general aspect thereof, to a method of building a belt structure in a tyre, in particular for motorcycle wheels.

2. Description of the Related Art

Tyre building for vehicle wheels involves formation of a carcass structure essentially made up of one or more carcass plies substantially shaped in a toroidal configuration and having their axially opposite side edges in engagement with respective annular reinforcing structures incorporating circumferentially inextensible annular elements, usually referred to as "rings".

Applied to the carcass structure, at a radially external position thereof, is a belt structure comprising one or more belt strips in the form of a closed ring, essentially made up of textile or metallic cords which are suitably oriented with respect to each other and to the cords belonging to the adjacent carcass plies.

In addition, a tread band is applied to the belt structure at a radially external position thereof, which tread band is usually made up of a strip of elastomer material of appropriate thickness.

To the aims of the present specification it should be pointed out that by the term "elastomer material" it is intended a rubber blend in its entirety, that is the assembly made up of at least one base polymer suitably amalgamated with reinforcing fillers and/or process additives of various types.

Finally, a pair of sidewalls is applied to the opposite sides of the tyre being formed, each of said sidewalls covering a side portion of the tyre included between a so-called shoulder region, located close to the corresponding side edge of the tread band, and a so-called bead located at the corresponding annular reinforcing structure.

While tyres for cars or trucks are characterised by a substantially flattened cross-section outline at the tread band, tyres for motorcycles are distinguishable due to their marked transverse curvature or bending, usually defined by the particular ratio value between the distance of the tread centre from the line passing through the opposite side extremities of the tread itself, measured at the equatorial plane of the tyre, and the distance measured along the tyre chord between said extremities. In tyres for two-wheeled vehicles the value of the bending ratio generally is at least as high as about 0.15 and it is usually in the order of 0.3 in the case of rear tyres, and even higher, until 0.45 in the case of front tyres, against a value usually smaller than 0.05 in tyres for motor-vehicles.

Formation of the belt structure is usually accomplished on an auxiliary metal drum, a "comb drum" for example or a smooth drum, on which one or more belt strips are formed and radially superposed to define a so-called belt ring, to which the tread band is then applied. In building of tyres having a high transverse curvature, formation of at least one belt strip is provided which is obtained by circumferentially winding up at least one textile or metallic and optionally rubberized cord into a plurality of coils disposed in axial side by side relationship according to a winding angle of substantially zero value with respect to the equatorial plane, on expandable sectors of the auxiliary drum already in a radially expanded position and conveniently shaped so as to correspond to the curvature outline of the tyre.

After carrying out application of the tread band, the belt ring-tread band assembly is picked up from the comb drum to be coaxially fitted on the carcass structure previously made in the form of a cylindrical sleeve on a building drum. The carcass structure is then submitted to a conformation step by radial expansion of the carcass plies in a toroidal outline, concurrently with axial approaching of the annular reinforcing structures. During this step, the carcass plies adhere to the inner surfaces of the belt ring previously disposed in coaxial relationship around the carcass sleeve.

In the case of a belt structure having cords oriented with a substantially zero angle relative to the equatorial plane of the tyre being formed, it is not possible to lay down the cords on a cylindrical surface and thus give said surface a toroidal conformation, because said circumferential orientation of the cords does not enable elongation of the latter to the extent required by conformation, in motorcycle tyres. Therefore the cord must be formed into spirals directly on the outline of the carcass or the drum having already reached a toroidal conformation.

Up to now it has been found it convenient, for process reasons, not to wind up one single cord, but to simultaneously wind up several cords in the form of a strap. Exactly straps are ribbons of elastomer material incorporating two to ten cords at least partly. Actually, laying down of bare cords with a substantially zero angle relative to the equatorial plane of the tyre would lead to slipping of same out of the desired position during the winding step on the toroidal outline, exactly due to their precarious position.

Therefore forming the cords into a strap has the function of ensuring maintenance of the desired position by the cords during all the tyre preparation steps.

For the above aim in document EP-A-0 718 122 in the name of the same Applicant, application of a thin layer of elastomer material (laying layer) filled with aramid fibres or the like is suggested before winding up of the coils. In more detail, this layer is formed by winding up on the auxiliary drum, a thin blend sheet obtained from calendering, of a thickness included by way of example between 0.075 and 0.5 mm, and of a width substantially corresponding to the width of the belt structure to be obtained.

The Applicant has found it useful to utilise, in making the belt layer as above described, cords of the so-called high starting elongation type, for example metallic cords of the HE or HI type, as commonly identified in the field, or elastic textile cords.

The abbreviation HE means "High Elongation" and points out that winding of the strands in the cord and the wires in each strand is carried out in the same direction (according to the so-called Lang's Lay construction).

In addition, winding is of such a nature that small movements of the strands relative to each other are allowed. In this way the finished cord substantially acquires a particular load-elongation curve of its own which has an important change of slope, usually called "knee", in the elongation values on achieving a given load. In particular, the starting line of the curve shows very important elongations for small load variations, and is connected through the knee to the final line of the curve showing very small elongations for important load variations.

A cord of this type is described in document EP-B-461 646, in the name of the same Applicant. The centre line value of the knee conditions the correct building and moulding of the tyre and, to this aim, it usually corresponds to an elongation included between 0.4% and 1%.

The abbreviation HI identifies cords in which at least one of the wires is deformed due to bending along its longitudinal extension, so as to create gaps where rubber penetrates into the cord. This type of cord has an intermediate behaviour (defined by the curve load/elongation) between that of the cords in opposite directions (of the Regular Lay type) and that of the cords in the same direction (of the Lang's Lay type).

As an alternative to the metallic cords, use of elastic textile cords is provided, made of Kevlar (polyethylene terephthalate) for example. These cords are made up of bundles of filaments of organic material, suitably twisted so as to achieve behavioural features similar to those of the above described metallic cords.

SUMMARY OF THE INVENTION

In accordance with the present invention, the applicant has found it advantageous to make said laying layer by winding up, either directly on the carcass structure or on a rigid support element, such as the assembly of convex sectors of a rigid and dismountable comb drum or a toroidal drum the radially external surface of which conforms in shape to the radially internal surface of the tyre being processed, at least one continuous strip-like element of elastomer material, preferably directly fed from an extruder head, in order to form a plurality of coils disposed axially close to each other so as to cover the whole width of the belt structure to be formed.

In the following, unless differently stated, by the term "support mandrel" it is intended the carcass structure or rigid support element on which the strip-like element is wound up in accordance with the invention.

In fact, it has been found that such a building method can be advantageously embodied in modern process conceptions aiming at eliminating or at least limiting the requirement of producing and storing semifinished products, as described in document EP-A-0928680 in the name of the same Applicant, for example. In particular, the method in reference makes it advantageously possible to meet the requirement of immediately differentiating the geometrical and structural features of the components of the belt structure in connection with the size and/or model of the tyre being processed.

The above stated results and still others that will become more apparent in the course of the present description are achieved in accordance with the present invention by a method of building a belt structure of a tyre, in particular for two-wheeled vehicles, comprising the steps of:

forming at least one laying layer of elastomer material on an outer surface of a support mandrel conforming in shape to an outer surface of a carcass structure of a tyre being processed;

helically winding at least one continuous bare cord on said laying layer, to form a plurality of coils with said cord which are disposed axially in side by side relationship, characterized in that the laying layer is formed by laying down at least one continuous strip-like element of elastomer material in the form of helical coils axially distributed on the outer surface of the support mandrel.

BRIEF DESCRIPTION OF THE DRAWINGS

Further features and advantages will be best understood from the detailed description of a preferred but not exclusive embodiment of a method of building a belt structure for tyres, in particular for two-wheeled vehicles, and a tyre to be obtained by said method, in accordance with the present invention. This description will be set out hereinafter with reference to the accompanying drawings given by way of non-limiting example, in which.

DETAILED DESCRIPTION OF THE EXEMPLARY EMBODIMENTS

Figure 1:
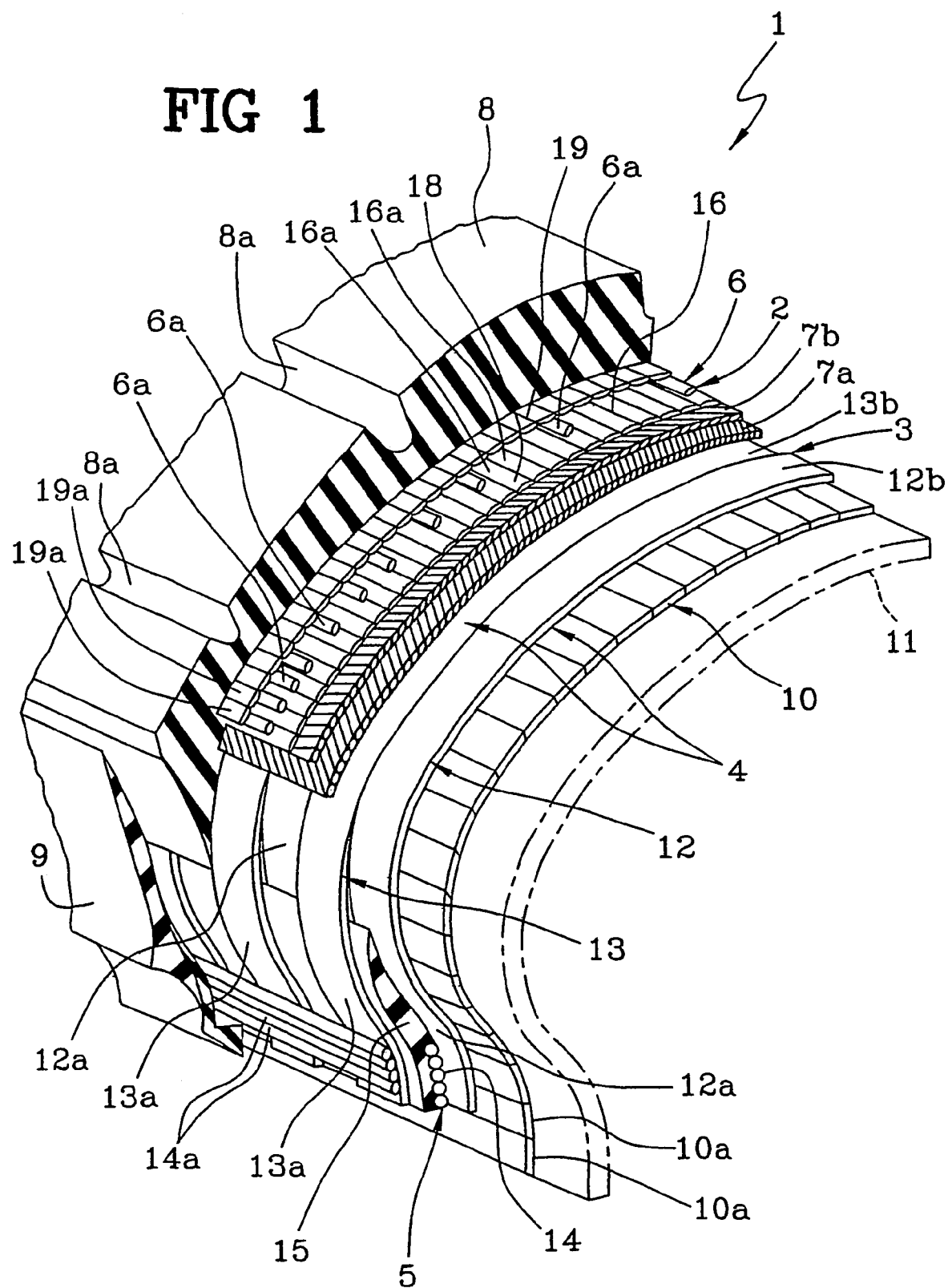
FIG. 1 is a fragmentary perspective and split view of a tyre for motorcycles provided with a belt structure built in accordance with the present invention.

With reference to the drawings, a tyre, in particular for two-wheeled vehicles, having a belt structure 2 built in accordance with the present invention has been generally identified by reference numeral 1.

The belt structure 2 is circumferentially applied to a carcass structure 3 which, in this specific case, has two carcass plies 4 of a substantially toroidal configuration in engagement by their opposite circumferential edges with a pair of annular reinforcing structures 5 (only one of which is shown in the drawings), each of them being located, when the tyre has been finished, in the region usually identified by "bead".

The belt structure 2 comprises at least one primary belt strip 6 made up of one or more continuous parallel cords wound up into coils 6a disposed axially close to each other and laid down with a substantially zero angle relative to the equatorial plane of the tyre, as well as, in the present case, of auxiliary belt strips 7a, 7b comprising cords that are disposed obliquely according to respectively crossed orientations, placed at a radially internal position with respect to the primary belt strip 6. Circumferentially superposed on the belt structure 2 is a tread band 8 in which longitudinal and/or transverse grooves 8a are formed following a moulding operation carried out concurrently with tyre vulcanization, which grooves are disposed so as to define a desired "tread pattern".

The tyre further comprises a pair of so-called "sidewalls" 9 laterally applied to the carcass structure 3 on opposite sides thereof.

In the present case the carcass structure 3 is coated on its inner walls with a so-called liner 10 essentially consisting of a layer of air-tight elastomeric material adapted to ensure a hermetic seal to the tyre when inflated.

The present invention can be advantageously put into practice within the context of a building method according to which, except for that which is described in more detail in the following of the present specification, assembling of the above listed components as well as production of one or more of them, is preferably obtained following the teachings proposed in document EP-A-976536 in the name of the same Applicant. As provided in the above mentioned document, each component of tyre 1 is obtained by laying down on a toroidal support 11 (only diagrammatically shown) the shape of which matches that of the inner conformation of the tyre, one or more elements obtained from an elongated semifinished product continuously fed in the vicinity of the toroidal support itself.

The toroidal support 11, of a cross-section outline having a bending ratio at least as high as 0.15, in conformity with the bending ratio of tyre 1 to be made, can have reduced sizes with respect to those of the finished tyre, of a linear measure value preferably included between 2% and 5%, taken by way of example, along the circumferential extension of the support itself at an equatorial plane X—X thereof which is coincident with the equatorial plane of tyre 1.

In more detail, liner 10 can be obtained by winding up a continuous strip-like element of appropriate elastomer material on the outer surface of the toroidal support 1 to form a plurality of coils 10a disposed in axial side by side relationship and/or radial superposition, so as to define a continuous layer adapted to integrally coat the inner surface of tyre 1.

Each carcass ply 4 can be in turn made up of a plurality of lengths 12, 13 circumferentially distributed around the geometric axis of tyre 1 and each extending in a U-shaped configuration to define two side portions 12a, 13a spaced apart from each other in an axial direction, and a crown portion 12b, 13b extending at a radially external position between the side portions 12a, 13a. In more detail, the presence of a first series of lengths 12 and a second series of lengths 13 is preferably provided and they are laid down on the toroidal support 11 in two successive steps and have the respective side portions 12a, 13a axially spaced apart from each other by interposition of one or more of the construction components belonging to the annular reinforcing structures 5. Lengths 12, 13 belonging to the first and second series respectively can be distributed according to a circumferential pitch substantially corresponding to their width to form two separate carcass plies. For tyres intended for use in motorcycles it is however preferably provided that, as shown in FIG. 1, the lengths 12, 13 of each series should be distributed according to a circumferential pitch corresponding to a multiple of their width, so that the crown portions 13b of the lengths 13 belonging to the second series are each interposed between the crown portions 12b belonging to two consecutive lengths of the first series 12, to form a single carcass ply 4 altogether.

Depending on requirements, lengths 12, 13 belonging to the first and second series can be laid down in planes that are radial to the rotation axis of the toroidal support 11, or offset in parallel relative to said radial plane, as described in document WO 00/38906 in the name of the same Applicant, to obtain a respectively crossed orientation of their side portions 12a, 13a, keeping the crown portions 12b, 13b oriented perpendicular to a circumferential direction. Deposition can be also carried out in an inclined orientation relative to the circumferential extension direction of the toroidal support 11, to give the crown portions 12b, 13b a desired inclination, not exceeding 15 degrees for example, relative to said circumferential direction.

Each of the annular reinforcing portions 5 preferably comprises an annular anchoring insert 14 which is substantially inextensible in a circumferential direction, located close to the radially internal edge of the carcass structure 3, and a filling insert 15 of elastomer material, tapering radially away from the anchoring insert 14.

The annular anchoring insert 14 is preferably obtained by winding up of an elongated element directly against the side portions 12a of lengths 12 belonging to the first series, so as to form a plurality of coils that are radially superposed in succession. The filling insert 15 can be in turn directly formed in contact with the annular anchoring insert 14, for instance by applying, possibly in several coils disposed in axial side by side relationship and/or radial superposition, a continuous strip of appropriate elastomer material coming out of an extruder disposed close to drum 11.

To the aims of the present specification it is pointed out that by "extruder" it is intended that part of the extrusion apparatus that is also identified in the particular field by the term "extruder head", provided with a so-called "die" passed through by the product being processed at an opening shaped and sizes so as to meet the geometric and dimensional features to be given to the product itself.

The anchoring insert 14 and filling insert 15 are preferably applied before deposition of lengths 13 belonging to the second series. An auxiliary anchoring insert 14a can be subsequently formed against the side portions 13a of lengths 13 belonging to the second series, previously laid down in superposed relationship on the insert 14 and filling 15.

Subsequently to deposition of lengths 13 belonging to the second series, formation of the belt structure 2 takes place.

In the preferential embodiment herein described in which, as previously said, building of individual components directly on the tyre being processed is provided, the belt structure 2 is produced directly on the carcass structure 3 that, together with the toroidal support 11, in this case also performs the function of support mandrel for formation of the individual components of the belt structure 2 itself.

However, the process in accordance with the invention can be advantageously put into practice also in the context of building methods in which the belt structure 2 is produced separately from the carcass structure 4, to be joined to the latter in a subsequent step. In this case, the operating steps aiming at making the individual components of the belt structure 2 can be carried out on the outer surfaces of a drum or other appropriate support mandrel, conveniently shaped so as to match the outer surface of the carcass structure 4 with which the belt structure 2 will be associated.

For the purpose of building the belt structure 2 it is provided that after possible application of the auxiliary belt strips 7a, 7b formation of which can be carried out in any convenient manner, the primary belt strip 6 should be formed by winding up of the continuous cord coils 6a on the carcass structure 3.

Formation of the primary belt strip 6 is advantageously preceded by formation of at least one laying layer 16 of elastomer material adapted to constitute an attachment substrate adapted to promote a steady positioning of the individual coils 6a on the tyre being processed.

The laying layer 16 is advantageously formed by laying down at least one continuous strip-like element 17 in the form of helical coils 16a oriented in a substantially circumferential direction and axially distributed on the outer surface of the carcass structure 4, at the crown portions 12b, 13b of lengths 12, 13. In more detail, the continuous strip-like element 17 is provided to be laid down on the carcass structure 4 concurrently with its extrusion from an extruder, and formation of the primary belt strip 6 is provided to be preferably carried out immediately after completion of the laying layer 16.

By operating in the above described manner, there is an advantage because the cord coils 6a are formed on the laying layer 16 when the elastomer material constituting said layer is still relatively hot, just as an indication at a temperature at least as high as 35° C., because it still keeps most of the heat generated during the extrusion process. In this way adhesion of the individual cord coils 6a to the laying layer 16 is promoted, without addition of heat by means of external devices being required for the purpose.

Figure 5:
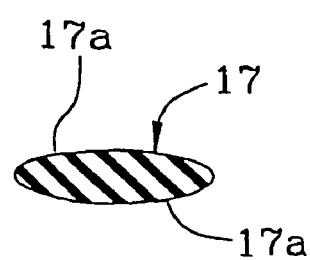
FIG. 5 shows the cross-section outline to an enlarged scale of an alternative embodiment of the strip-like element in FIG. 4.
Figure 4:
FIG. 4 shows the cross-section outline to an enlarged scale of a strip-like element of elastomer material to be used for carrying out the process in question.

In addition, appropriate grip recesses 18 are provided to be defined on the laying layer 16 having an average thickness included, just as an indication, between 0.2 mm and 1 mm, preferably corresponding to 0.7 mm, said recesses being suitably oriented in the same winding direction as the cord coils 6a, to further promote steady positioning of same. To this aim, as seen in FIG. 4, the continuous strip-like element 17 can be advantageously formed, using a suitably shaped extruder head, with at least a convex outer surface 17a facing away from the outer surface of the carcass structure 4 to which the strip-like element itself is applied. Alternatively, as viewed from FIG. 5, the continuous strip-like element 17 can also have a lenticular cross-section outline, with two convex surfaces 17a turned towards respectively opposite sides. Both embodiments shown in FIGS. 4 and 5 enable formation of the grip recesses 18 to be caused between each coil 16a and the coils adjacent thereto, directly following winding of the continuous strip-like element 17 according to a spiralling pitch that can be included, just as an indication, between 1 mm and 10 mm, and preferably corresponding to the width of the strip-like element itself.

A similar effect can be achieved by use of a strip-like element 17 of a constant thickness, wound up according to a spiralling pitch smaller than its width, so as to cause a more or less marked overlapping of each coil 16a on the previously formed coil.

The laying layer 16 made as above described is surprisingly able to ensure steadiness of positioning of the cord coils 6a even when, as provided in a preferential embodiment of the invention, the primary strip 6 of the belt structure 2 is formed using a completely or substantially rubber-free cord. This feature is particularly advantageous when the method, as in the described example, applies to a greatly automated building process in which maximum simplification of the installation is required along with a great production flexibility.

The possibility of using bare cords, i.e. rubber-free cords, in fact eliminates the requirement of arranging calendering and/or extrusion apparatuses adapted to carry out cord rubberizing. Also greatly facilitated is replacement of the type of cord used in the production process, without the need for long and/or particularly complicated interventions to be carried out on the production plant.

It is also to be pointed out that, during the cord rubberizing process aiming at forming the strap, the cord is submitted to tensions that modify the operating features thereof (elongation to low loads) impairing regularity and evenness of the subsequent expansion of the belt structure within the vulcanization mould, as depicted in more detail in the following in connection with a similar phenomenon that can be found during the deposition step of the belt structure itself.

In particular, to the aims of the formation of the primary belt strip 6 cords made of steel of the type having a high starting elongation can be advantageously used, the tensile behaviour of which represented on a load/elongation curve is characterized by the presence of a starting line of low slope, which is an index of high extensibility for low loads, followed by a final line of marked slope, which is an index of high toughness for loads higher than a predetermined value. In particular, preferably used are cords in which the transition region (knee) between the starting line and final line of the load/elongation curve develops around an elongation in the order of 0.7%, for instance cords the size of which is 3×3×0.175.

The Applicant has noticed that if the primary belt strip 6 should be formed following the teachings of the known art, it would be necessary to give the cord being wound an important tensioning in order to avoid undesirable displacements of the individual coils 6a taking place as a result of the marked surface bending of the carcass structure 4 or other type of support mandrel therein used.

This tensioning would modify the operating features (elongation to low loads) of the cord thereby impairing regularity and evenness of the subsequent expansion of the belt structure within the vulcanization mould.

The presence of the laying layer 16, on the contrary, enables a steady positioning of the individual coils 6a to be ensured, even in the absence of tensioning on the cord or other thread-like element used during the winding step, or in the presence of a tensioning of a very reduced amount.

In particular, it is advantageously possible to carry out winding of the cord giving the same a tensioning not exceeding 1500 grams, preferably of 1000 grams, more preferably of 500 grams, or in any case of such an amount that an elongation not exceeding 0.3% is imposed to a cord of the type preferably used in accordance with the invention.

As will be further specified in the following, this aspect makes it possible to exploit in an optimal manner the features typical of the cords preferably employed in accordance with the present invention.

Winding of the cord for making coils 6a can take place according to a constant spiralling pitch of a value at least as high as the diameter of the cord used, or a varying pitch having an increasing value on coming close to the equatorial plane of the tyre as described in document EP-A-808730 in the name of the same Applicant, for example.

When formation of the primary belt strip 6 has been completed, at least one covering layer 19 of elastomer material is preferably formed in radial superposed relationship with the primary strip itself. The primary layer 19 can be obtained, in the same manner as described with reference to the laying layer 16, by laying down at least one second strip-like element of elastomer material in the form of axially distributed helical coils 19a, said second element being preferably laid down concurrently with its extrusion from an extruder head.

Then the tread band 8 and sidewalls 9, that can be obtained in any manner convenient for a person skilled in the art, are applied to the belt structure 2.

Figure 2:
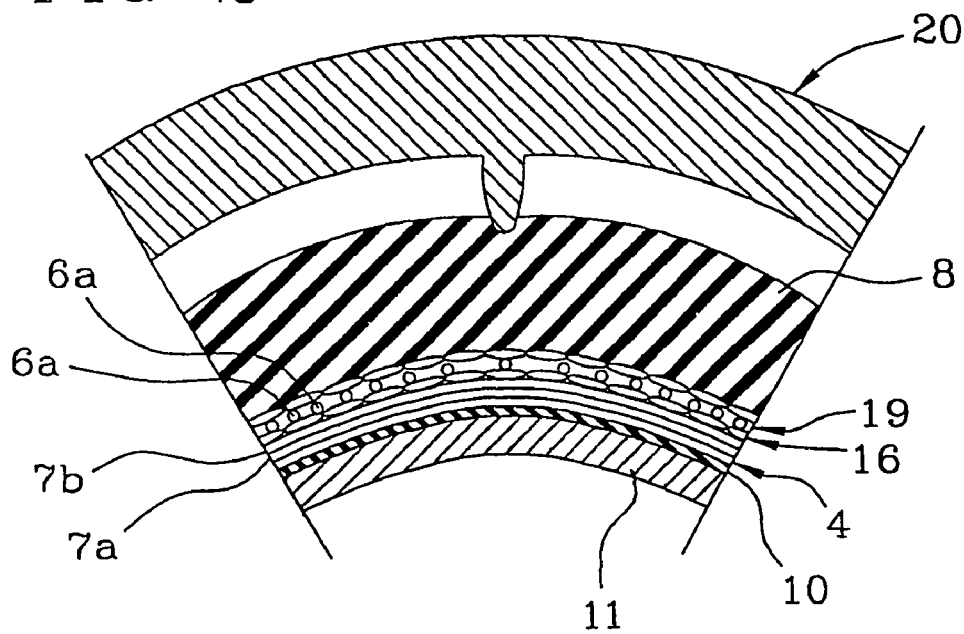
FIG. 2 is a fragmentary section taken in a radial plane of the tyre in FIG. 1 introduced into a vulcanization mould.
Figure 3:
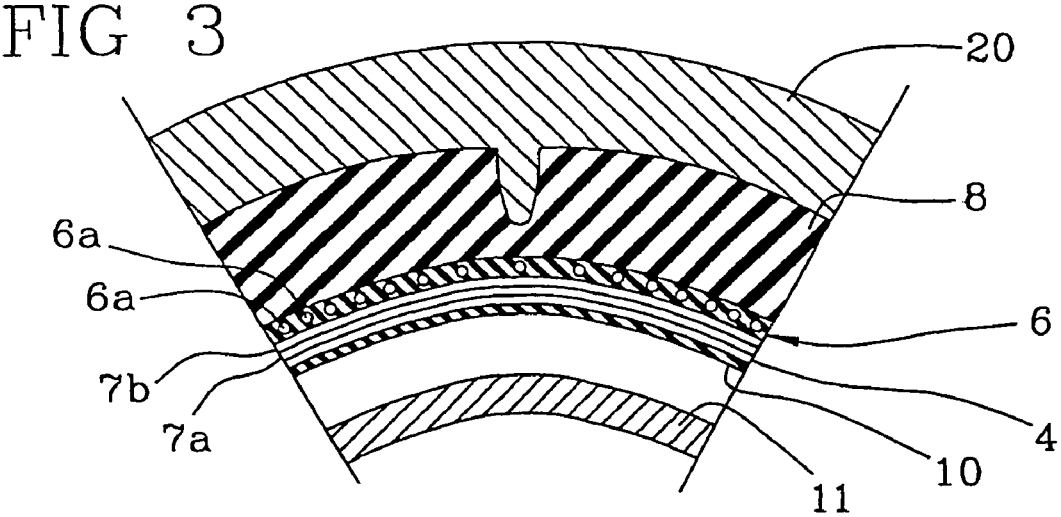
FIG. 3 shows the tyre in FIG. 2 during an end step of the moulding and vulcanization process within the mould.

Tyre 1 thus built now lends itself to be submitted, after possible removal from support 11, to a moulding and final vulcanization process, carried out within one mould diagrammatically shown and denoted at 20 in FIGS. 2 and 3. During the moulding and vulcanization process pressing of tyre 1 against the inner walls of mould 20 is imposed, by effect of the pressure of the steam or other pressurized fluid directly introduced into the tyre or into an inflatable bladder within the moulding cavity. Following such a pressing action, permeation of the elastomer material between the cord coils 6a forming the primary belt layer 6 is obtained as well as within the cord itself. Coils 6a and the individual cord strands are therefore intimately incorporated into the elastomer material forming the laying layer 16 and the possible covering layer 19, causing evacuation through the material porosity of air bubbles possibly formed during application of the covering layer 19 and/or the tread band 8. This effect can be clearly inferred by comparing FIGS. 2 and 3, in which the size of said air bubbles has been intentionally exaggerated.

In more detail, in the preferential embodiment shown, tyre 1 is provided to be introduced into mould 20 together with the toroidal support 11, to carry out the moulding and vulcanization process as described in document EP-A-9765EE, in the name of the same Applicant.

By effect of pressure of the steam admitted to within mould 20, the belt structure 2 along with the other components of tyre 1 close thereto are provided to be submitted to a radial expansion, as clearly shown in FIG. 3, where the inner surface of tyre 1 is clearly spaced apart from the outer surface of the toroidal support 11. This radial expansion that greatly facilitates the moulding process of tyre 1 is made possible or at all events greatly promoted by the residual capability of extension of the cord used in forming the circumferential coils 6a. In fact, the cord is adapted to lengthen thereby backing up the circumferential extension increase resulting from radial expansion until reaching of a point (an elongation value) included within the transition line (knee) between the starting line and the final line of the load/elongation curve.

The radial capability of extension of tyre 1 is conditioned by the capability of extension or stretchability of the cord. Therefore, achievement of two targets appears to be advantageous, i.e. that of using bare cords which therefore are not submitted to tensions during the process of incorporating them into a strap, and that of carrying out winding of the circumferential coils 6a without imposing an excessive tensioning to the cord therein used because in the presence of excessive tensioning the residual stretchability of said cord during the moulding and vulcanizing process would be greatly reduced if not cancelled.

The present invention achieves important advantages.

The method of the invention in fact lends itself to drastically limit previous arrangement of semifinished products for building the tyre even when there is a requirement for producing small amounts of tyres having different construction features. In this connection it should be noted that the laying layer 16 and the possible covering layer 19 can be formed of any size in width and/or thickness, using one and the same continuously extruded strip-like element.

The possibility of using rubber-free cords (i.e. cords that are not even partly incorporated into a strap) for formation of the primary belt strip 6 enables an immediate replacement of the type of cord used, without any interventions on the calendering and/or extrusion apparatus that, on the contrary, would be necessary should the cord be of the rubberized type. In addition, as already pointed out above, submitting the cord to tensions that would be harmful to the following steps of the production process is avoided.

Winding of the cord coils 6a on a still hot elastomer material laid down so as to create circumferential recesses 18 ensures steadiness of the coils without being obliged to resort to tensioning of the cord during the winding operation.

Thus it is possible to fully exploit the cord features in the subsequent moulding and vulcanization process of the tyre, without the occurrence of undesirable contacts between the cords of the belt structure 2 and the cords of the carcass structure 3, due to radial expansion of the carcass structure in the absence of a corresponding expansion of the belt structure itself. In addition, the process can be advantageously carried out directly on the carcass structure of the tyre being built.

The invention claimed is:

1. A method of forming a belt structure for a tyre, comprising:
    forming at least one laying layer of elastomer material on an outer surface of a support mandrel; and
    helically winding up at least one continuous bare cord on the at least one laying layer to form a plurality of coils;
    wherein the at least one laying layer is formed by laying down at least one first continuous strip element of elastomer material in a form of helical coils,
    wherein the helical coils of the at least one first strip element are axially distributed on an outer surface of the support mandrel,
    wherein the support mandrel is conformed in shape to an outer surface of a carcass structure of the tyre, and
    wherein the coils of the at least one cord are disposed axially in side-by-side relationship.

2. The method of claim 1, wherein the at least one first strip element is laid down on the outer surface of the support mandrel concurrently with extrusion of the at least one first strip element from an extruder head.

3. The method of claim 1, wherein during winding up the at least one cord, the at least one laying layer comprises a temperature greater than 35° C.

4. The method of claim 1, wherein forming the at least one laying layer gives rise to grip recesses for a continuous thread element.

5. The method of claim 4, wherein the grip recesses are formed according to a same winding direction as the coils of the at least one cord.

6. The method of claim 1, wherein the at least one first strip element comprises at least one convex outer surface facing away from the outer surface of the support mandrel.

7. The method of claim 6, wherein laying down the at least one first strip element gives rise to grip recesses between the helical coils of the at least one first strip element, and
    wherein the helical coils of the at least one first strip element are disposed axially close to each other.

8. The method of claim 1, wherein the support mandrel is at least partly defined by the carcass structure of the tyre.

9. The method of claim 1, wherein the support mandrel comprises a rigid toroidal support, and
    wherein a shape of the toroidal support matches that of an inner surface of the carcass structure of the tyre.

10. The method of claim 1, wherein the at least one cord comprises a high starting elongation.

11. The method of claim 10, wherein the at least one cord comprises a conformation of the Lang's-lay type.

12. The method of claim 10, wherein the at least one cord comprises at least one wire deformed along a longitudinal extension of the at least one wire.

13. The method of claim 10, wherein the at least one cord comprises an elastic textile cord.

14. The method of claim 10, wherein during helically winding up the at least one cord, the at least one cord is submitted to a tensioning corresponding to a percent elongation of the at least one cord not exceeding 0.3%.

15. The method of claim 10, wherein during helically winding up the at least one cord, the at least one cord is submitted to a tensioning not exceeding 1,500 grams.

16. The method of claim 10, wherein during helically winding up the at least one cord, the at least one cord is submitted to a tensioning not exceeding 1,000 grams.

17. The method of claim 10, wherein during helically winding up the at least one cord, the at least one cord is submitted to a tensioning not exceeding 500 grams.

18. The method of claim 1, wherein after helically winding up the at least one cord, at least one covering layer of elastomer material is formed at a radially external position relative to the at least one cord.

19. The method of claim 18, wherein forming the at least one covering layer precedes applying a tread band to the belt structure.

20. The method of claim 18, wherein forming the at least one covering layer comprises laying down at least one second continuous strip element of elastomer material in a form of helical coils, and wherein the helical coils of the at least one second strip element are axially distributed on an outer surface of the support mandrel.

21. The method of claim 20, wherein the at least one second strip element is laid down on the outer surface of the support mandrel concurrently with extrusion of the at least one second strip element from an extruder head.

22. The method of claim 10, further comprising:

causing permeation of the elastomer material of the at least one laying layer between the coils formed by the at least one cord, concurrently with a radial expansion imposed to the belt structure during a final moulding and vulcanization process of the tyre.

23. The method of claim 10, further comprising:

causing permeation through the at least one cord of the elastomer material of the at least one laying layer, concurrently with a radial expansion imposed on the belt structure during a final moulding and vulcanization process of the tyre.

24. The method of claim 1, wherein the tyre is a tyre for a motorcycle.

* * * * *

UNITED STATES PATENT AND TRADEMARK OFFICE
CERTIFICATE OF CORRECTION

| | | |
|---|---|---|
| PATENT NO. | : 7,094,302 B2 | Page 1 of 1 |
| APPLICATION NO. | : 10/473175 | |
| DATED | : August 22, 2006 | |
| INVENTOR(S) | : Giancarlo Armellin et al. | |

It is certified that error appears in the above-identified patent and that said Letters Patent is hereby corrected as shown below:

Title page, and column 1, line 1: item (54), in the Title: METHOD OF FORMING A BELT STRUCTURE IN A TIRE, IN PARTICULAR FOR MOTORCYCLE WHEELS" should read --METHOD OF FORMING A BELT STRUCTURE FOR A TYRE--.

Claim 22, column 12, line 10, "imposed to" should read --imposed on--.

Signed and Sealed this

Fifth Day of December, 2006

JON W. DUDAS
*Director of the United States Patent and Trademark Office*